United States Patent
Dalcher et al.

(10) Patent No.: US 8,776,233 B2
(45) Date of Patent: Jul. 8, 2014

(54) SYSTEM, METHOD, AND COMPUTER PROGRAM PRODUCT FOR REMOVING MALWARE FROM A SYSTEM WHILE THE SYSTEM IS OFFLINE

(75) Inventors: Gregory William Dalcher, Tigard, OR (US); Joel R. Spurlock, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 216 days.

(21) Appl. No.: 12/896,734

(22) Filed: Oct. 1, 2010

(65) Prior Publication Data
US 2013/0276113 A1 Oct. 17, 2013

(51) Int. Cl.
*G06F 21/00* (2013.01)

(52) U.S. Cl.
USPC ............ 726/24; 726/22; 726/23; 726/25; 713/2; 713/100; 713/187; 713/188

(58) Field of Classification Search
None
See application file for complete search history.

(56) References Cited

U.S. PATENT DOCUMENTS

| | | | |
|---|---|---|---|
| 6,347,375 B1* | 2/2002 | Reinert et al. | 726/24 |
| 7,877,809 B1* | 1/2011 | Sutton et al. | 726/24 |
| 7,934,261 B1* | 4/2011 | Saguiguit et al. | 726/24 |
| 2004/0236960 A1* | 11/2004 | Zimmer et al. | 713/200 |
| 2005/0138159 A1* | 6/2005 | Challener et al. | 709/223 |
| 2005/0229250 A1* | 10/2005 | Ring et al. | 726/23 |
| 2008/0016178 A1* | 1/2008 | Portugali | 709/217 |
| 2008/0052507 A1* | 2/2008 | Chow et al. | 713/2 |
| 2008/0235436 A1* | 9/2008 | Zimmer et al. | 711/103 |
| 2009/0217377 A1* | 8/2009 | Arbaugh et al. | 726/23 |
| 2011/0078497 A1* | 3/2011 | Lyne et al. | 714/15 |
| 2011/0209220 A1* | 8/2011 | Tikkanen et al. | 726/24 |

OTHER PUBLICATIONS

U.S. Appl. No. 12/427,637, filed Apr. 21, 2009.
U.S. Appl. No. 12/415,641, filed Mar. 31, 2009.

* cited by examiner

*Primary Examiner* — Jung Kim
*Assistant Examiner* — Adrian Stoica
(74) *Attorney, Agent, or Firm* — Wong Cabello Lutsch Rutherford & Brucculeri LLP

(57) ABSTRACT

A system, method, and computer program product are provided for removing malware from a system while the system is offline. In use, a system is identified as being infected with malware. Additionally, it is determined whether the malware can be fully removed from the system while the system is online. Further, at least part of the malware is conditionally removed from the system while the system is offline, based on the determining.

20 Claims, 5 Drawing Sheets

SYSTEM, METHOD, AND COMPUTER PROGRAM PRODUCT FOR REMOVING MALWARE FROM A SYSTEM WHILE THE SYSTEM IS OFFLINE

FIELD OF THE INVENTION

The present invention relates to malware, and more particularly to malware removal.

BACKGROUND

Traditionally, repairing a system infected with malware has been considered important in order to preserve the integrity of data on the system. However, the ability to repair systems infected or damaged by malware has oftentimes been quite limited. For example, the malware itself may interfere with the repair. In another example, artifacts of normal system operations such as files that are opened for exclusive access may also prevent a full repair.

This lack of a robust repair capability may leave systems vulnerable to one or more later attacks (e.g., with partially removed malware), and may also result in an incomplete repair of malware damage. In addition, the above issues may also make it difficult to safely perform a system repair in a manner that does not leave the system in an unstable state. There is thus a need for addressing these and/or other issues associated with the prior art.

SUMMARY

A system, method, and computer program product are provided for removing malware from a system while the system is offline. In use, a system is identified as being infected with malware. Additionally, it is determined whether the malware can be fully removed from the system while the system is online. Further, at least part of the malware is conditionally removed from the system while the system is offline, based on the determining.

DETAILED DESCRIPTION

Figure 1:
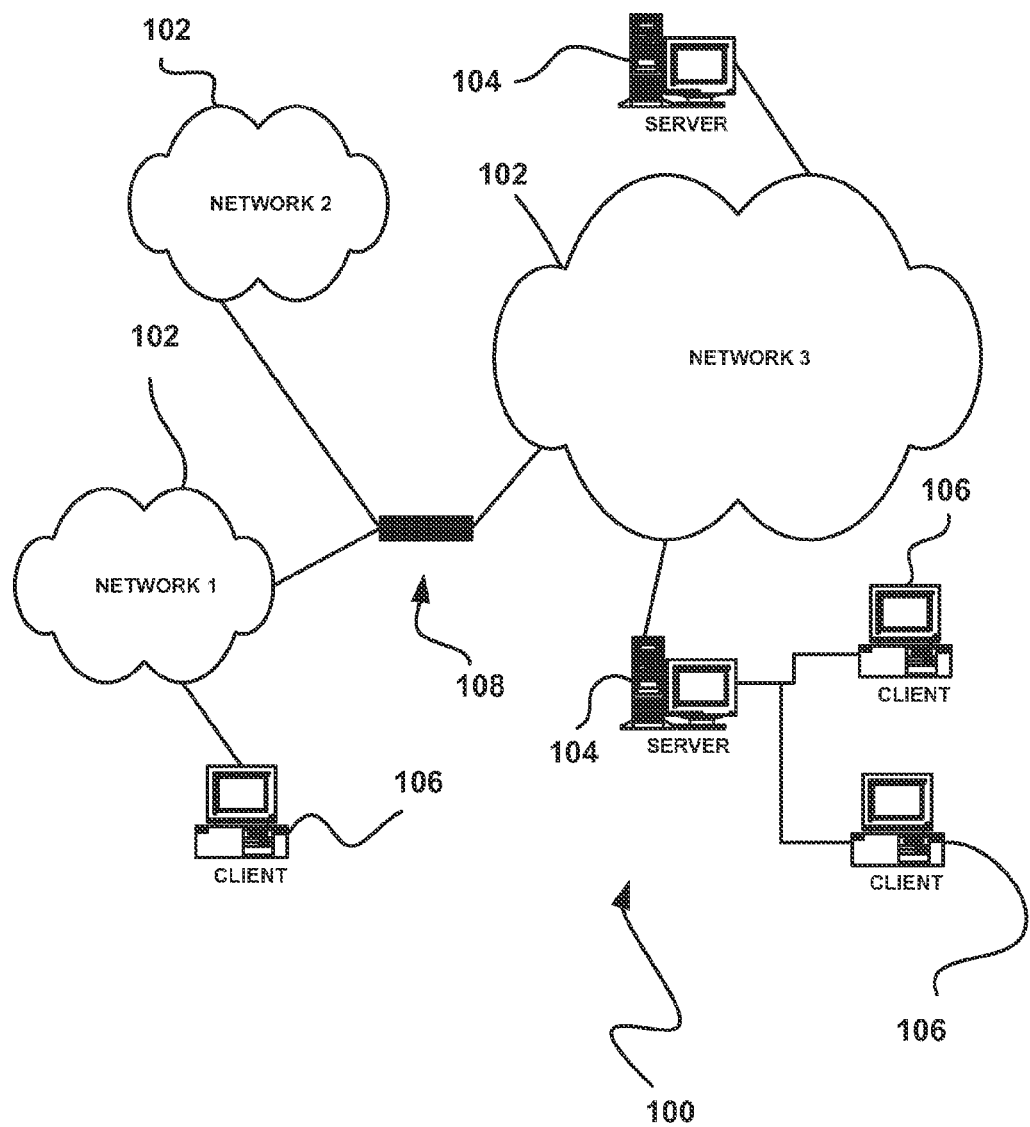
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
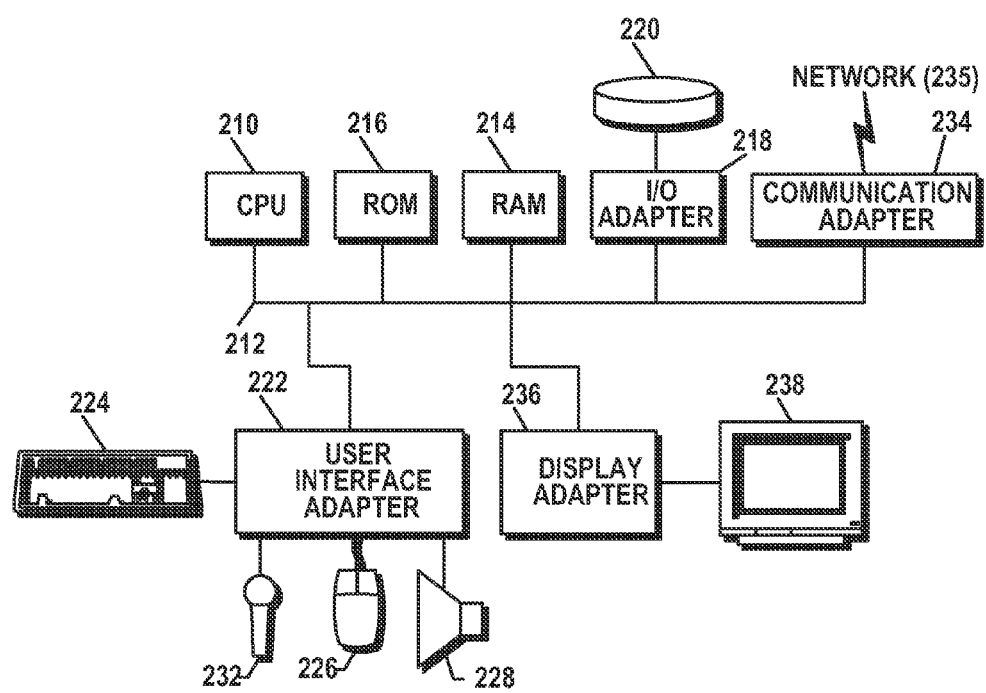
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
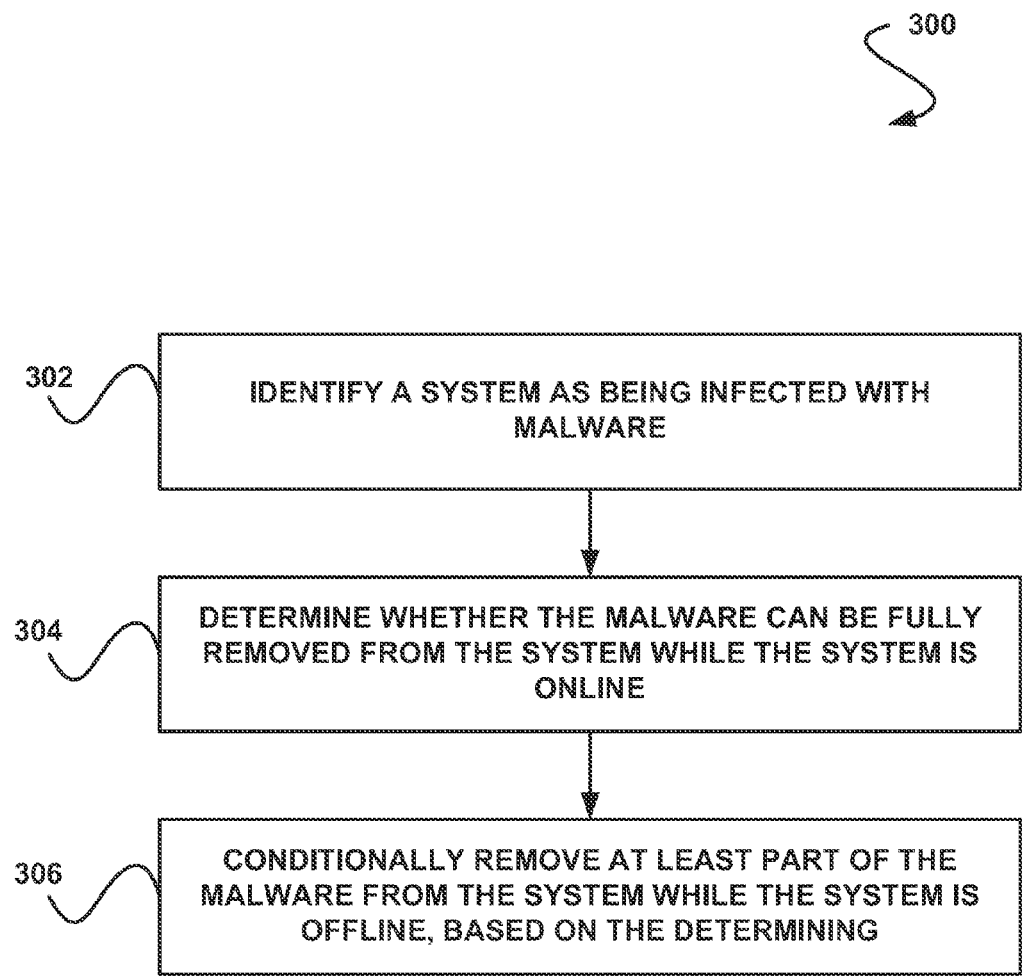
FIG. 3 shows a method for removing malware from a system while the system is offline, in accordance with another embodiment.

FIG. 3 shows a method 300 for removing malware from a system while the system is offline, in accordance with another embodiment. As an option, the method 300 may be carried out in the context of the architecture and environment of FIGS. 1 and/or 2. Of course, however, the method 300 may be carried out in any desired environment.

As shown in operation 302, a system is identified as being infected with malware. In the context of the current embodiment, the system any include any entity that can be infected with malware. For example, the system may include a server, a personal computer, a gateway, a router, a cellular telephone, a personal digital assistant (PDA), etc. Additionally, in one embodiment, the malware may include one or more viruses, elements of adware, elements of spyware, and any other software or code that is considered malicious or otherwise undesirable.

Further, in one embodiment, the malware may have infected the system over a network. For example, a user may have downloaded one or more files containing the malware onto the system. In another example, the malware may have infected the system by exploiting a vulnerability of the system, a backdoor of the system, etc. Of course, however, the malware may have infected the system in any manner.

Further still, as shown in operation 304, it is determined whether the malware can be fully removed from the system while the system is online. In one embodiment, the system may be online if the system is currently running. For example, the system may be considered to be online if the system is currently running an operating system. In another example, the system may be considered to be online if the system is currently running a basic input/output system (BIOS) of the system. In another embodiment, the system may be considered to be online if the system is currently booting the operating system.

Additionally, in one embodiment, determining whether the malware can be fully removed from the system may include determining whether all elements of the malware can be removed from the system. For example, it may be determined whether all data on the system that is determined to be malware can be removed from the system while the system is online. In another embodiment, the determining may include determining whether all data on the system that is altered by the malware can be removed from the system, replaced with clean data, or otherwise repaired while the system is online.

Also, in one embodiment, determining whether the malware can be fully removed from the system may include determining whether one or more files in the system associated with the malware are in use (e.g., by the operating system, etc.), locked against modification, etc. In another embodiment, determining whether the malware can be fully removed from the system may include determining whether one or more executables associated with the malware (e.g., one or more drivers, etc.) have already been loaded in the boot process. In yet another embodiment, determining whether the malware can be fully removed from the system may include determining whether the system has imposed one or more restrictions against the modification of one or more files associated with the malware.

Further, in another embodiment, removal of the malware from the system may include deleting one or more files on the system associated with the malware (e.g., malware files, etc.), as well as modifying or restoring one or more files on the system associated with the malware (e.g., malware affected files, malware support files, etc.). Of course, however, the malware may be removed from the system in any manner.

Also, as shown in operation 306, at least part of the malware is conditionally removed from the system while the system is offline, based on the determining. In one embodiment, the system may be offline if the system is not currently running. For example, the system may be considered to be offline if the system is not currently running an operating system, a BIOS of the system, etc. In another embodiment, the system may be considered to be offline before the system boots the operating system.

Additionally, in one embodiment, if it is determined that the malware can be fully removed from the system while the system is online, then the malware may be removed from the system while the system is online. For example, one or more files or other data located on the system may be removed, altered, or deleted while the system is online.

Furthermore, in another embodiment, if it is determined that the malware cannot be fully removed from the system while the system is online, then at least part of the malware may be removed from the system while the system is offline. For example, if it is determined that the malware cannot be fully removed from the system while the system is online, a portion of the malware may first be removed from the system while the system is online. Further, another portion of the malware (e.g., the portion of the malware that could not be removed while the system was online, etc.) may then be removed from the system while the system is offline. In another embodiment, if it is determined that the malware cannot be fully removed from the system while the system is online, then the entirety of the malware may be removed from the system while the system is offline.

In yet another embodiment, removing at least part of the malware from the system while the system is offline may include altering the system so that it is offline. For example, the system may be shut down, restarted, powered off, etc. In one embodiment, the system may be manually altered so that it is offline. In another embodiment, the system may be automatically altered so that it is offline (e.g., according to a predetermined schedule, etc.). In yet another embodiment, one or more entities may be alerted before the system is altered so that it is offline. For example, a user of the system may be alerted, a system administrator may be alerted, etc.

Also, in one embodiment, a storage area outside the system may be utilized in conditionally removing at least part of the malware from the system while the system is offline. In one embodiment, the storage area outside the system may include a persistent storage area. For example, one or more tasks, data identifications, or other information may be stored on the persistent storage area external to the system in order to assist with the removal of at least part of the malware from the system while the system is offline. In another embodiment, the persistent storage area external to the system may be read during removal of at least part of the malware while the system is offline.

Further, in another embodiment, at least part of the malware may be removed from the system while the system is offline utilizing one or more offline data access protocols. For example, offline system data may be accessed utilizing an offline data access protocol, such as virtual system access, a pre-boot environment provided by a chipset extension, a pre-boot environment provided by a hard disc drive of the system, etc.

In addition, in one embodiment, it may be determined whether a repair validation of the system is needed. For example, a previous repair of the system (e.g., in response to malware infection, etc.) may have occurred when the system was online, and it may be determined that a confirmation of that repair is desired (e.g., based on the type of malware infection, etc.). Further, in response to a determination that the repair validation of the system is needed, one or more actions may be performed on the system while the system is offline. For example, one or more actions performed during the previous repair when the system was online may be validated while the system is offline. In another embodiment, the repair validation of the system may be scheduled. For example, the repair validation may be scheduled when the system is online, after a repair of the system, etc. Further, in one embodiment, the repair validation may be scheduled to occur once the system is offline (e.g., once the system is shut down, powered off, etc.).

Figure 4:
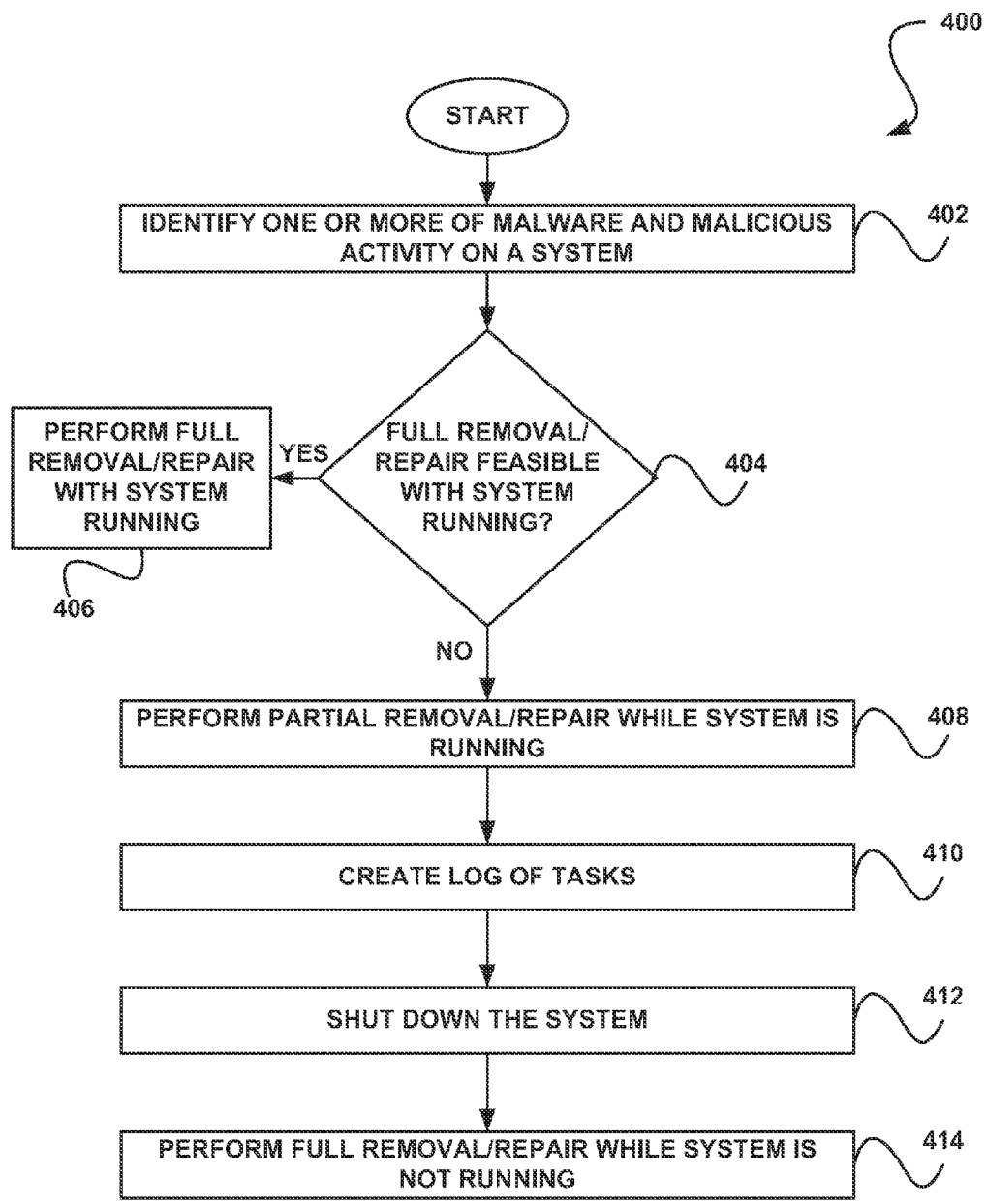
FIG. 4 shows a method for monitoring a protected system, in accordance with yet another embodiment.

FIG. 4 shows a method 400 for monitoring a protected system, in accordance with another embodiment. As an option, the method 400 may be carried out in the context of the architecture and environment of FIGS. 1-3. Of course, however, the method 400 may be carried out in any desired environment.

As shown in operation 402, one or more of malware and malicious activity are identified on a system. In one embodiment, one or more malware detection entities may identify the malware and/or malicious activity on the system. For example, security software may include malware detection software installed on the system that may monitor a system and identify the malware and/or the malicious activity on the system.

Additionally, as shown in decision 404, it is determined whether full removal of the malware and/or the malicious activity as well as repair of any damage caused by the malware and/or the malicious activity is feasible with the system running. In one embodiment, it may be determined whether a driver critical to the running system needs to be removed or altered. For example, it may be determined whether a driver such as a display driver or other system component driver critical to the running system is compromised, malicious, etc. and needs to be removed, restored, altered, etc.

Further, in another embodiment, it may be determined whether the system can allow or complete full removal of the malware and/or the malicious activity as well as repair of any damage caused by the malware and/or the malicious activity on the system. For example, it may be determined whether any files to be removed or altered are files that are used by the running system in an exclusive manner, such that the system may not allow deletion or modification of the files.

Further still, in yet another embodiment, it may be determined whether damage from the malware and/or the malicious activity has prevented full removal of all damage caused by the malware and/or the malicious activity with the system running. For example, it may be determined whether the malware and/or the malicious activity has damaged the running system to the point that the system can no longer perform one or more required damage removal operations (e.g., deleting one or more infected files, etc.).

Also, in another embodiment, it may be determined whether the malware and/or the malicious activity identified on the system is actively preventing removal of all damage caused by the malware and/or the malicious activity. For example, it may be determined whether the malware and/or the malicious activity identified on the system is protecting itself, is monitoring file alteration and/or deletion requests, is restoring formerly altered and/or deleted files, is blocking damage removal attempts, is tricking a user, security software, etc. into believing that a file alterations and/or deletions have been performed when they have not, is injecting itself into one or more system processes that cannot be terminated while the system is running, etc.

In still another embodiment, it may be predicted whether the full removal of the malware and/or the malicious activity as well as the repair of any damage caused by the malware and/or the malicious activity is feasible with the system running, based on one or more factors. For example, one or more files or other data in the system may be analyzed (e.g., compared against one or more patterns, etc.) in order to determine whether previously identified malicious activity is present in the system. Additionally, if previously identified malicious activity is determined to be present on the system, it may be determined whether such previously identified malicious activity (and all damage cause by such malicious activity) was able to be completely removed from a previous system with the previous system running. In this way, specific knowledge of a particular malware family, instance, etc. that has been detected may be used to determined whether removal and repair is feasible while the system is running.

Further, if in decision 404, it is determined that full removal of the malware and/or the malicious activity as well as repair of any damage caused by the malware and/or the malicious activity is feasible with the system running, then in operation 406, full removal of the malware and/or the malicious activity as well as repair of any damage caused by the malware and/or the malicious activity is performed on the system with the system running. For example, one or more files and/or other data on the system that are determined to be part of the malware and/or the malicious activity may be deleted, altered, restored, etc. while the system is running. In another example, one or more files and/or other data on the system that are determined to be damage caused by the malware and/or the malicious activity may be deleted, altered, restored, etc. while the system is running. Of course, however, the full removal of the malware and/or the malicious activity as well as repair of any damage caused by the malware and/or the malicious activity with the system running may be performed in any manner.

Additionally, if in decision 404, it is determined that full removal of the malware and/or the malicious activity as well as repair of any damage caused by the malware and/or the malicious activity is not feasible with the system running, then in operation 408, partial removal of the malware and/or the malicious activity as well as partial repair of any damage caused by the malware and/or the malicious activity is performed on the system while the system is running. In one embodiment, a partial removal of the malware and/or the malicious activity may be performed on the system in order to neutralize the malware and/or the malicious activity. In another embodiment, all removal and repair actions possible while the system is running may be performed while the system is running. For example, it may be determined which actions necessary for full removal of the malware and/or the malicious activity as well as repair of any damage caused by the malware and/or the malicious activity can be performed while the system is running, and such removal and repair actions may then be performed while the system is running.

Further still, as shown in operation 410, a log of tasks necessary to complete a full removal of the malware and/or the malicious activity as well as repair of any damage caused by the malware and/or the malicious activity is created. For example, one or more files and/or other system data that were unable to be removed and/or repaired during the partial removal of the malware and/or the malicious activity and repair of any damage caused by the malware and/or the malicious activity on the system while the system is running may be placed in a task log.

In one embodiment, the task log may include a text document, a database file, or any other file capable of listing one or more tasks to be completed for a full removal of the malware and/or the malicious activity as well as repair of any damage caused by the malware and/or the malicious activity. For example, the task log may include a list of one or more files and/or other data on the system. In another example, the task log may include one or more actions to be taken on the one or more files and/or other data on the system while the system is not running.

In another embodiment, the task log may include one or more instructions for validating that one or more actions performed while the system is running have actually been performed. For example, the task log may include an identification of one or more files and/or other data that were deleted, altered, restored, etc. on the system while the system was running. In another example, the task log may include one or more actions to take in order to confirm that such files and/or other data were in fact deleted, altered, restored, etc. on the system (e.g., comparing the files against one or more files physically located on the system, etc.).

Also, in yet another embodiment, the task log may be stored in a location external to the system. For example, the task log may be stored in a persistent storage area external to the system that does not require the system to be running in order to operate. In this way, the task log may contain all information necessary to fully remove the malware and/or the malicious activity on the system and fully repair any damage caused by the malware and/or the malicious activity while the system is not running. Additionally, see, for example, U.S. patent application Ser. No. 12/427,637, filed Apr. 21, 2009, which is hereby incorporated by reference in its entirety, and which describes examples of communication paths for facilitating removal and repair requests between security products.

Also, as shown in operation 412, the system is shut down. In one embodiment, a user and/or administrator of the system may be notified of the need to shut down the system. For example, a pop-up window or other alert may be presented to the user and/or administrator that the system needs to be shut down, restarted, etc. (e.g., in order to continue removal of the malware and/or the malicious activity as well as repair of any damage caused by the malware and/or the malicious activity, etc.). In another embodiment, the user and/or administrator may postpone the system shut down (e.g., to save one or more files on the running system, to close a currently running application on the system, etc.). In yet another embodiment, the user and/or administrator may manually shut down the system, in response to the notification.

Additionally, in another embodiment, the system may be shut down automatically. For example, the system may be shut down without alerting a user or administrator of the system. In one embodiment, the system may be shut down automatically if permitted by a policy (e.g., a company policy, a system policy, etc.). Also, in another embodiment, the system may be shut down utilizing an environment separate from the system. For example, a persistent environment that executes externally to the protected system may include a component that monitors when the system is compromised and needs to be shut down for repair, and may shut down the system automatically in response to the monitoring.

Further, as shown in operation 414, full removal of the malware and/or the malicious activity as well as repair of any damage caused by the malware and/or the malicious activity is performed on the system while the system is not running. For example, any remaining removal of the malware and/or the malicious activity as well as any remaining repair of any damage caused by the malware and/or the malicious activity that could not be performed during the partial removal while the system was running may be performed while the system is not running.

Figure 5:
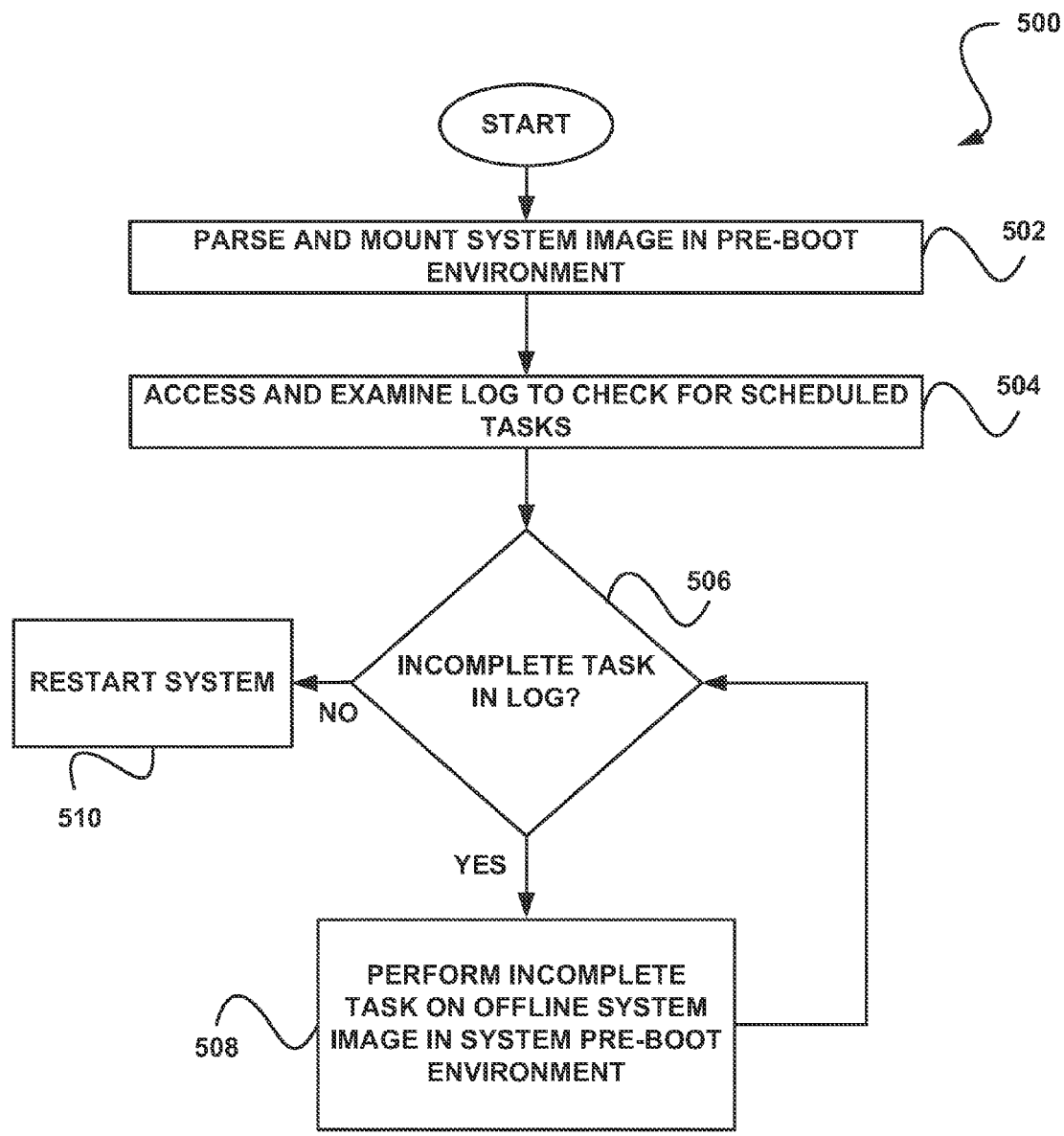
FIG. 5 shows a method for malware removal and damage repair on a system while the system is not running, in accordance with still yet another embodiment.

FIG. 5 shows a method 500 for malware removal and damage repair on a system while the system is not running, in accordance with another embodiment. As an option, the method 500 may be carried out in the context of the architecture and environment of FIGS. 1-4. Of course, however, the method 500 may be carried out in any desired environment.

As shown in operation 502, a system image is mounted and parsed in a system pre-boot environment. For example, the system image may be accessed while the system is not running (e.g., prior to the system booting up, etc.). In one embodiment, the pre-boot environment may be provided through virtualization. For example, one or more virtualized guest images (e.g., one or more images of instances of a virtual machine which to all software running within it appears to be a separate physical machine) associated with the system may be mounted within an environment separate from the system (e.g., within a virtualization host (host of one or more virtualization guests), a dedicated virtualization guest, etc.). Additionally, through this mounting the guest may not be running, which may afford a pre-boot view of the guest (e.g., the system) if the image was taken when the guest was shut down.

Further, in another embodiment, the pre-boot environment may be provided through a disk associated with the system. For example, a disk-based bootstrap or operating system early-boot environment may be used to launch operating system images. Such early-boot environment may be run when the disc is booted from, which may provide a pre-boot environment for the operating system that will later be launched by the bootstrap code. In another embodiment, the disk may include a code stub (e.g., a master boot record, etc.) that is run when the disk is powered on, and an extension may be added to the code stub that may be run before the disk runs, thereby allowing access to the disk before it is run.

Further still, in yet another embodiment, the pre-boot environment may be provided through an operating system. For example, the system may include an operating system that supplies a pre-boot environment. Also, in still another embodiment, the pre-boot environment may be provided through a chipset extension. For example, a chipset extension may allow mounting of one or more disks outside of full system operation. In another embodiment, such an environment may be able to execute independently of a full system launch (e.g., through a disk-based bootstrap process, etc.). In another example, before a main system disk is started, a smaller hardware hosted pre-boot environment may be activated that may access the main system disk at rest.

In this way, the pre-boot environment may provide a setting to mount one or more operating system images without running operating system code, or at least a minimum subset (e.g., in the case of the operating system-supplied pre-boot environment). Additionally, both read and write access to the image's file system structure may be allowed in the pre-boot environment.

Additionally, as shown in operation 504, a log is accessed and examined in order to check for scheduled offline repair or repair validation tasks. In one embodiment, the log may include the log stored in persistent memory accessible from the pre-boot environment and may include tasks necessary to complete a full removal of the malware and/or the malicious activity as well as repair of any damage caused by the malware and/or the malicious activity, as illustrated in operation 410 hereinabove. Further, as shown in decision 506, it is determined whether the log contains an incomplete task. For example, it may be determined whether the log contains one or more tasks to be performed on the system which have not yet been performed.

Additionally, if it is it determined in decision 506 that the log contains an incomplete task, then in operation 508 the incomplete task is performed on the offline system image in the system pre-boot environment. In one embodiment, performing the task may include one or more of adding, removing, modifying, and restoring files and configuration database information (e.g., information in a registry of the system, etc.). For example, performing the task may include removing and/or deregistering installed software (e.g., one or more drivers, etc.). In another embodiment, performing the task may include one or more of modifying a boot configuration and modifying boot data.

Further, in one embodiment, performing the task may include initiating a security product update. For example, one or more of a signature and executable components of the security product may be updated. In another embodiment, performing the task may include restoring an integrity of the security product. For example, one or more elements of the security product (e.g., registration of critical security product components, content used by the security product, etc.) that have been altered or removed by malware and/or malicious activity may be restored.

Further still, in one embodiment, performing the task may include altering registration of early load components (e.g., one or more software components, for example drivers, which load and begin execution in the early stages of the system boot). For example, see U.S. patent application Ser. No. 12/415,641, filed Mar. 31, 2009, which is hereby incorporated by reference in its entirety, and which describes examples of altering registration of early load components. Also, in one embodiment, performing the task may include validating one or more repairs performed on the system. For example, the offline system image may be accessed in order to assess that a desired repair (e.g., a repair performed while the system was running, etc.) was fully completed and not later reversed (e.g., by a malware component, etc.).

Additionally, a repair validation may be desired even when a complete repair to a system when it is online appears to be viable. For example, the security software may request a repair validation in cases of certain malware having been detected (e.g., one or more rootkits, etc.). Additionally, the repair validation may examine the offline system to determine whether one or more desired repairs were fully completed and not later reversed by malware. For example, a linked list of disk entries that were performed on the system while it was running may be followed on the offline system in order to confirm that they were performed properly.

In this way, it may be determined whether malware and/or malicious activity has tricked a user, security software, etc. into believing that a file alterations and/or deletions have been performed when the system was running when they have not in fact been performed. Such alterations and/or deletions may then be performed if not already done so.

Additionally, once the incomplete task is performed on the offline system image in the system pre-boot environment, it is again determined in decision 506 whether the log contains an incomplete task. Further, if it is it determined in decision 506 that the log does not contain an incomplete task, then in operation 510 the system is restarted. Additionally, in one embodiment, one or more operating system return values (e.g., result status of requested operation, etc.) may be used to determined whether a full repair was successful. For example, it may be determined whether full removal of the malware and/or the malicious activity as well as repair of any damage caused by the malware and/or the malicious activity has occurred. Additionally, a repair validation check may also be performed to determine whether a full repair was successful.

In this way, full removal of the malware and/or the malicious activity on the system as well as repair of any damage caused by the malware and/or the malicious activity to the system may be performed while the system is offline.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium comprising instructions stored thereon to cause one or more processors to:
   identify a system as being infected with malware while the system in online mode;
   identify portions of the malware that can be fully removed from the system while the system remains in online mode;
   determine that at least a portion of the malware cannot be removed while the system remains in online mode;
   create, while the system is in online mode, a list of tasks to fully remove the malware from the system while the system is in offline mode, the list of tasks providing a description of actions required to fully remove the malware;
   obtain the list of tasks in a pre-boot environment while the system is in offline mode, wherein the pre-boot environment is provided by a chipset extension of the one or more processors; and
   process the list of tasks to complete removal of the malware while the system is in the pre-boot environment and in offline mode, wherein the system is in offline mode when the system is in the pre-boot environment and the system is not executing code of an operating system, a basic input output system (BIOS), or booting the operating system.

2. The computer program product of claim 1, wherein the system is concurrently executing code of the operating system while identifying the system as being infected and creating the list of tasks.

3. The computer program product of claim 1, wherein the instructions to cause the one or more processors to determine that at least a portion of the malware cannot be removed include instructions to cause the one or more processors to determine that one or more files in the system associated with the malware are in use.

4. The computer program product of claim 1, wherein the instructions to cause the one or more processors to determine that at least a portion of the malware cannot be removed include instructions to cause the one or more processors to determine that one or more files in the system associated with the malware are locked against modification.

5. The computer program product of claim 1, wherein the instructions to cause the one or more processors to determine that at least a portion of the malware cannot be removed include instructions to cause the one or more processors to determine that one or more executables associated with the malware have already been loaded in a boot process.

6. The computer program product of claim 5, wherein the one or more executables associated with the malware include one or more drivers.

7. The computer program product of claim 1, wherein the instructions to cause the one or more processors to determine that at least a portion of the malware cannot be removed include instructions to cause the one or more processors to determine that the system has imposed one or more restrictions against a modification of one or more files associated with the malware.

8. The computer program product of claim 1, wherein the computer program product is operable such that the removal of the malware from the system includes deleting one or more files associated with the malware from the system.

9. The computer program product of claim 1, further comprising instructions to cause the one or more processors to determine whether a repair validation of the system is needed.

10. The computer program product of claim 9, further comprising instructions to cause the one or more processors to perform one or more actions on the system while the system is in offline mode in response to a determination that the repair validation of the system is needed.

11. The computer program product of claim 1, further comprising instructions to cause the one or more processors to remove a portion of the malware from the system while the system is in online mode prior to processing the list of tasks in offline mode.

12. The computer program product of claim 1, further comprising instructions to cause the one or more processors to remove an entirety of the malware from the system while the system is in offline mode.

13. The computer program product of claim 1, wherein a storage area outside the system is utilized while removing at least the portion of the malware from the system while the system is in offline mode.

14. The computer program product of claim 13, wherein the storage area outside the system includes a persistent storage area.

15. A method, comprising:
- identifying a system as being infected with malware while the system in online mode;
- identifying and removing portions of the malware that can be fully removed from the system while the system remains in online mode;
- determining that at least a portion of the malware cannot be removed while the system remains in online mode;
- creating, while the system is in online mode, a list of tasks to fully remove the malware from the system while the system is in offline mode, the list of tasks providing a description of actions required to fully remove the malware;
- obtaining the list of tasks in a pre-boot environment while the system is in offline mode, wherein the pre-boot environment comprises an operating mode provided by a chipset extension of one or more hardware processors; and
- processing the list of tasks to complete removal of the malware while the system is operating in the pre-boot environment and in offline mode, wherein the system is in offline mode when the system is in the pre-boot environment and the system is not executing code of an operating system, a basic input output system (BIOS), or booting the operating system.

16. The method of claim 15, further comprising removing a portion of the malware from the system while the system is in online mode prior to processing the list of tasks.

17. The method of claim 15, further comprising removing an entirety of the malware from the system while the system is in offline mode.

18. A system, comprising:
- one or more processors; and a memory;
- wherein the memory stores instructions to cause the one or more processors to:
- identify the system as being infected with malware while the system in online mode;
- identify and remove portions of the malware that can be fully removed from the system while the system remains in online mode;
- determine that at least a portion of the malware cannot be removed while the system remains in online mode;
- create, while the system is in online mode, a list of tasks to fully remove the malware from the system while the system is in offline mode, the list of tasks providing a description of actions required to fully remove the malware;
- obtain the list of tasks in a pre-boot environment while the system is in offline mode, wherein the pre-boot environment is an operating mode provided by a chipset extension of the one or more processors; and
- process the list of tasks to complete removal of the malware while the system is operating in the pre-boot environment and in offline mode, wherein the system is in offline mode when the system is in the pre-boot environment and the system is not executing code of an operating system, a basic input output system (BIOS), or booting the operating system.

19. The system of claim 18, wherein the instructions to cause the one or more processors to remove a portion of the malware from the system while the system is in online mode prior to processing the list of tasks.

20. The system of claim 18, further comprising instructions to cause the one or more processors to remove all of the malware from the system while the system is in offline mode.

* * * * *